United States Patent
Jahnke et al.

(10) Patent No.: US 6,760,802 B2
(45) Date of Patent: Jul. 6, 2004

(54) TIME-OUT COUNTER FOR MULTIPLE TRANSACTION BUS SYSTEM BUS BRIDGE

(75) Inventors: Steven R. Jahnke, Tokyo (JP); Hiromichi Hamakawa, Ibaraki (JP)

(73) Assignee: Texas Instruments Incorporated, Dallas, TX (US)

(*) Notice: Subject to any disclaimer, the term of this patent is extended or adjusted under 35 U.S.C. 154(b) by 321 days.

(21) Appl. No.: 09/932,379

(22) Filed: Aug. 17, 2001

(65) Prior Publication Data

US 2002/0052996 A1 May 2, 2002

Related U.S. Application Data

(60) Provisional application No. 60/231,071, filed on Sep. 8, 2000.

(51) Int. Cl.[7] .............................................. G06F 13/14
(52) U.S. Cl. ...................... 710/305; 710/306; 710/315; 710/56
(58) Field of Search .............................. 710/8, 22, 18, 710/41, 45, 40, 107, 100, 111, 112, 113, 116, 241, 243, 244, 240, 305, 306, 309, 312, 315; 711/1, 17; 714/10

(56) References Cited

U.S. PATENT DOCUMENTS

| | | | | |
|---|---|---|---|---|
| 5,623,672 A | * | 4/1997 | Popat | 710/240 |
| 5,845,097 A | * | 12/1998 | Kang et al. | 710/117 |
| 6,021,483 A | | 2/2000 | Adar et al. | |
| 6,128,677 A | * | 10/2000 | Miller et al. | 710/40 |
| 6,260,093 B1 | * | 7/2001 | Gehman et al. | 710/309 |
| 6,532,511 B1 | * | 3/2003 | Brooks | 710/305 |
| 6,571,308 B1 | * | 5/2003 | Reiss et al. | 710/315 |
| 6,601,118 B1 | * | 7/2003 | Rooney | 710/56 |

FOREIGN PATENT DOCUMENTS

WO    WO 99 50753 A    10/1999

* cited by examiner

Primary Examiner—Khanh Dang
(74) Attorney, Agent, or Firm—Robert D. Marshall, Jr.; W. James Brady, III; Frederick J. Telecky, Jr.

(57) ABSTRACT

The time-out counter of this invention provides a capability in a bus bridge for a first bus master to generate a time-out interrupt on reads from a second bus device if it is not given control of the second bus within a certain time period when the time of arbitration on the second bus is excessive. The time-out counter is programmable up to 16-bits and allowing the software selection of the time-out length. This time-out feature is useful if the manner of arbitration used would otherwise allow the second bus master to have absolute control of the first bus. Address and data FIFO buffers are used for writes to a second bus device.

23 Claims, 4 Drawing Sheets

TIME-OUT COUNTER FOR MULTIPLE TRANSACTION BUS SYSTEM BUS BRIDGE

This application claims priority under 35 USC §119(e)(1) of Provisional Application No. 60/231,071, filed Sep. 8, 2000.

TECHNICAL FIELD OF THE INVENTION

The technical field of this invention is data transfer and data bus systems within computer systems.

BACKGROUND OF THE INVENTION

As computer systems have grown more complex, it has become common to employ multiple processors and a wide variety of peripheral devices to transfer data within a chip and from the chip to external devices and vice versa. Such systems almost always have a multiple set of busses separating, for convenience and performance reasons, the communication between similar devices. Multiple bus systems must provide bus controllers to allow for coherent and collision-free communication between separate buses. Micro-controllers are used for this purpose and they provide bus arbitration which determines, at a given time, which device has control of the bus in question.

A prominent standard bus system has emerged for high performance micro-controller designs. The 'Advanced Micro-controller Bus Architecture System' AMBA has been defined by Advanced RISC Machines (ARM) Ltd. (Cambridge, U.K.) and is described in U.S. Pat. No. 5,740,461, dated Apr. 14, 1998. Computer systems of a CISC variety are complex instruction set computers and have total backward compatibility requirements over all versions. RISC (reduced instruction set computer) systems, by contrast, are designed to have simple instruction sets and maximized efficiency of operation. Complex operations are accomplished in RISC machines as well, but they are achieved by using combinations of simple instructions. The RISC machines of ARM Ltd. forming the AMBA architecture are of primary interest here.

The standard AMBA has two main busses, a high performance AHB bus and a peripheral bus APB of more moderate performance. The AHB bus is the main memory bus and contains RAM and an external memory controller. In this basic system definition, if a high performance peripheral is required that will transfer large amounts of data, this peripheral is also placed on the high performance AHB bus. This decreases system performance, however, because the central processor unit (CPU) cannot have access to memory when the peripheral has control of the bus.

Advanced RISC Machines Ltd (ARM) has proposed an efficient arbitration scheme and split transfers to allow the CPU and the high performance peripheral to share bus time of the single AHB bus. ARM has also proposed use of a second bus for isolation and using a single arbiter. This proposal still allows only one transaction to progress at a given time period.

SUMMARY OF THE INVENTION

In a multiple transaction AHB bus system (MTAHB), if a master on one bus needs to read data from a slave on another bus, it must first arbitrate and win control on the primary AHB bus (the memory bus AHB in the MTAHB system). Then it must wait for arbitration and control of the secondary AHB bus (the high performance data transfer bus HTB in the MTAHB system). During this time, the primary AHB bus is held and no useful work can be done.

The time-out counter of this invention provides a capability in the AHB-to-HTB bus bridge for an AHB bus master to time-out if it is not given control of the bus in a certain time period. This would generally occur if the time of arbitration on the secondary HTB bus is excessive. The time-out counter is programmable up to 16-bits in the preferred embodiment. This allows the software flexibility in choosing the length of the time-out period.

This time-out feature is an addition to the concept of the original AHB bus and is useful if the manner of arbitration used would allow the bus master to have total control of the AHB bus. This shows itself in the AHB-HTB bus bridge when the AHB bus master requests a read, but the HTB peripheral may be in the process of a long data transfer and cannot be interrupted. The AHB peripheral can then time-out and begin or resume another task.

The time-out counter of this invention interacts with the rest of the system by generating an interrupt request when its content reaches hexadecimal '0000'. The central processing unit (CPU) then handles the interrupt and can switch tasks or perform some other function. The time-out counter interacts with no other modules outside the domain of the AHB-to-HTB bridge.

BRIEF DESCRIPTION OF THE DRAWINGS

These and other aspects of this invention are illustrated in the drawings, in which.

DETAILED DESCRIPTION OF PREFERRED EMBODIMENTS

The multiple transaction advanced high performance bus system (MTAHB) of this invention is used as an upgrade to the micro-controller bus architecture AMBA of Advanced RISC Machines Ltd. (ARM). The AMBA machines use RISC processors which are identified by the name ARM processors. Advanced RISC Machines Ltd. (Cambridge, U.K.) has been awarded U.S. Pat. No. 5,740,461, dated Apr. 14, 1998 in which this class of machines is fully described. The techniques used in this invention are of wider applicability, as will be shown, and can be used in a variety of multi-processor systems having multiple bus architectures.

Figure 1:
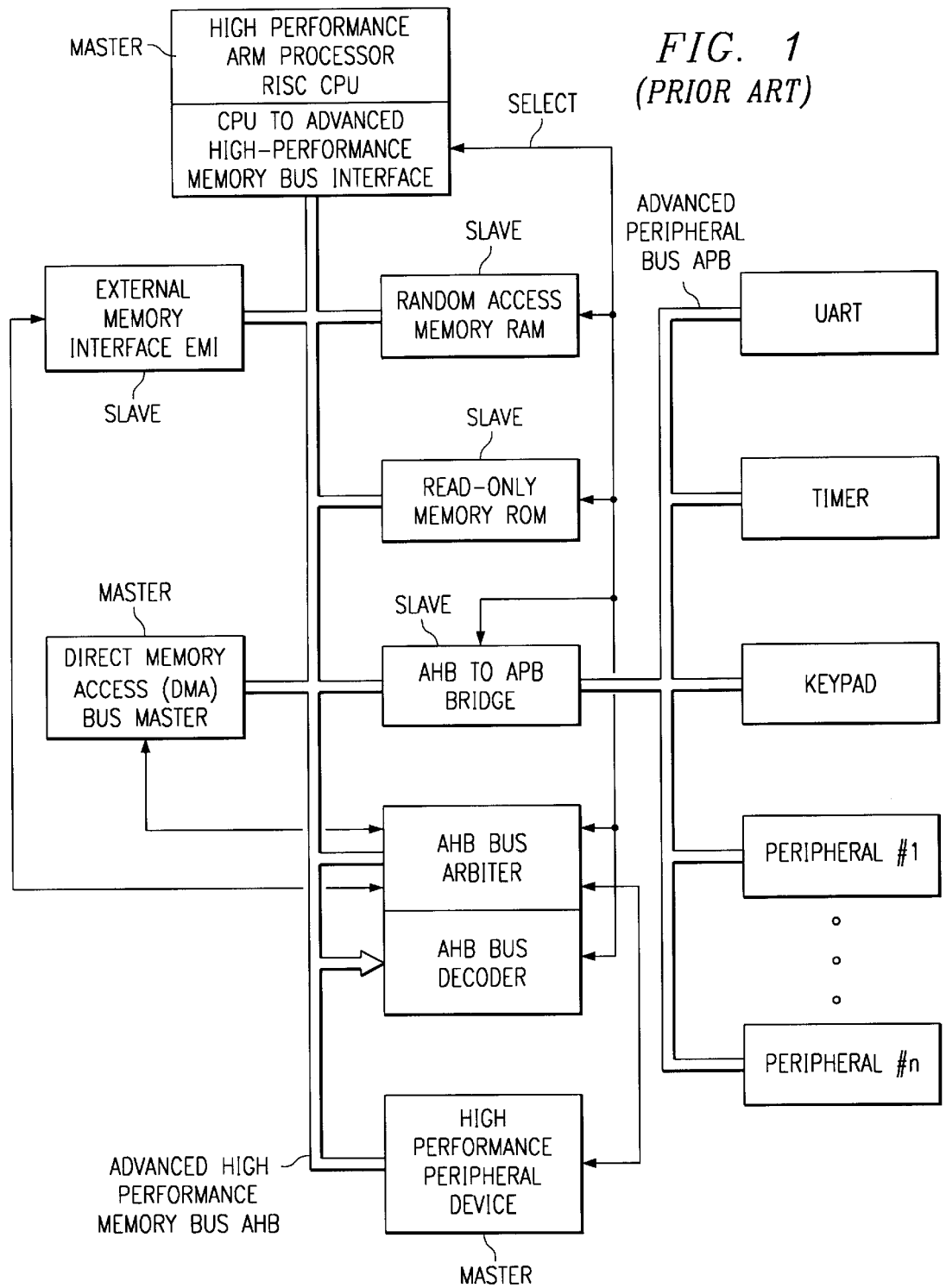
FIG. 1 illustrates the block diagram of a prior art advanced micro-controller bus architecture AMBA having a conventional AHB bus system.

FIG. 1 illustrates the AMBA standard. The AMBA has two main busses, an advanced high performance bus (AHB) 100 and an advanced peripheral bus (APB) 120 of more moderate performance. AHB bus 100 is the main memory bus and couples to CPU 101 via CPU advanced high performance memory bus interface 106 to random access memory (RAM) 107, read-only memory (ROM) 108 and an external memory interface (EMI) controller 102. FIG. 1 further illustrates a second master device direct memory access (DMA) unit 103 also coupled to AHB bus 100. Arbitration for bus access between the two masters, CPU 101 and DMA 103, takes place in AHB bus arbiter 110. AHB bus arbiter 110 controls access to the various slave devices via AHB bus decoder 111 and select lines 112. In this basic system definition, if a high performance peripheral is required that will transfer large amounts of data, this peripheral is also placed on the high performance AHB bus 100. FIG. 1 illustrates such a high performance peripheral device 130. Placing this high performance peripheral device 130 on AHB bus 100 decreases system performance, because CPU 101 and DMA 103 cannot have access to memory when high performance peripheral device 130 has control of AHB bus 100. ARM has proposed an efficient arbitration scheme and split transfers to allow the CPU 101, DMA 103 and the high performance peripheral 130 to share bus time of the single AHB bus 100.

ARM has also proposed use of a second bus for isolation and using a single arbiter. As shown in FIG. 1, this second bus is called the advanced peripheral bus (APB) 120. APB bus 120 operates in the same fashion as AHB bus 100. APB bus 120 is connected to AHB bus 100 via an AHB-to-APB bus bridge 109. AHB-to-APB bus bridge 109 is a slave to AHB bus 100. The two bus system with single AHB bus arbiter 110 is of limited usefulness, because it allows only one transaction to progress at a given time period. Note that all high performance devices including memory and high performance peripheral device 130 are on AHB bus 100. All peripheral devices of moderate performance including UART 115, timer 116, keypad 117 as well as peripherals 121 AND 122 reside on the peripheral bus 120.

Figure 2:
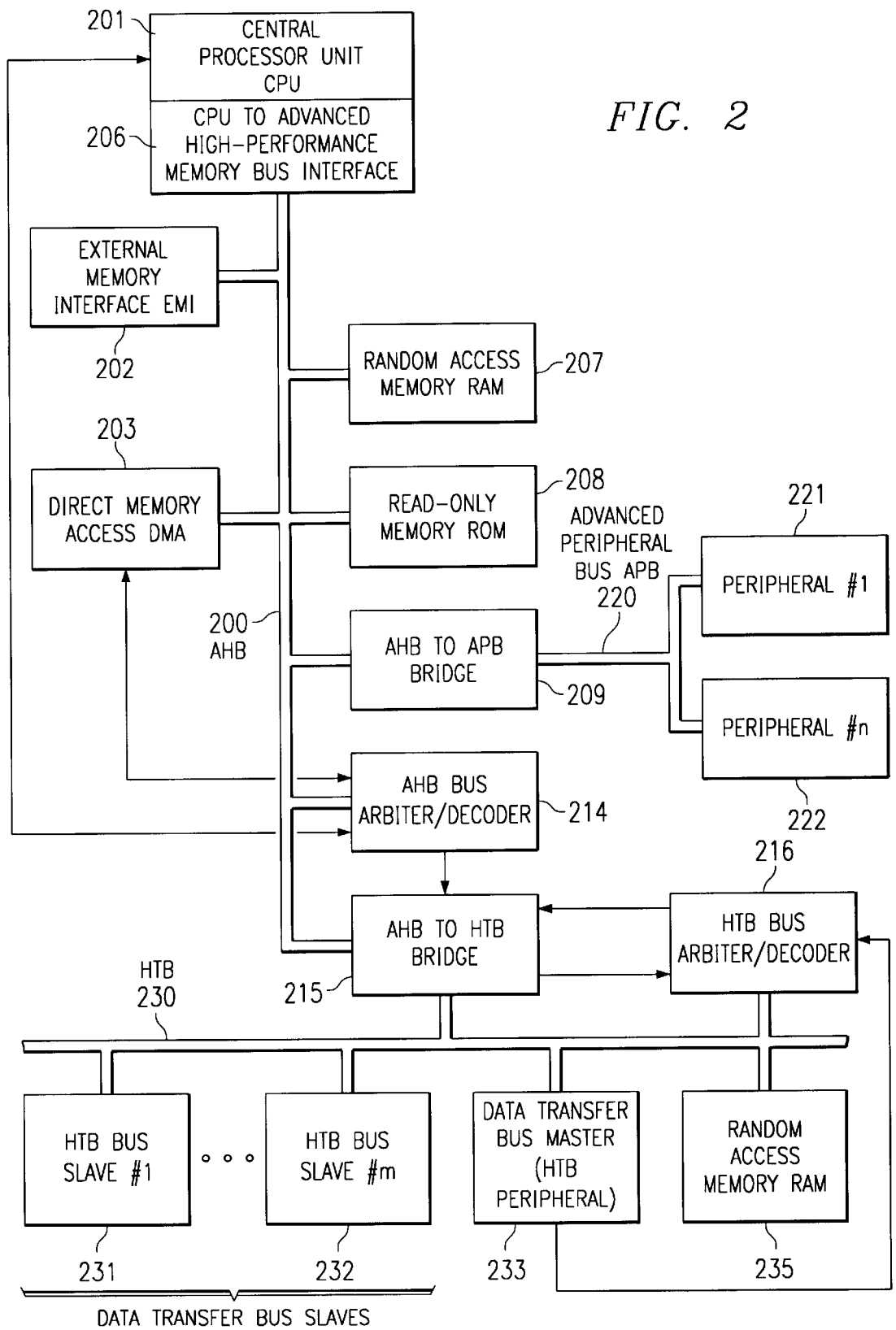
FIG. 2 illustrates the block diagram of an enhanced advanced micro-controller bus architecture having the multiple transaction two AHB-style bus system of this invention with two arbitrators.

FIG. 2 illustrates the multiple transaction advanced high performance bus system (MTAHB) of this invention. The MTAHB uses two AHB-style buses: AHB bus 200 retained as a memory bus; and HTB bus 230 provided for high data transfer bus. AHB bus 200 has AHB bus arbiter/decoder 214 and HTB bus 230 has HTB bus arbiter/decoder 216. Communication between AHB bus 200 and HTB bus 230 takes place via AHB-to-HTB bus bridge 215. AHB-to-HTB bus bridge 215 provides more than just isolation between AHB bus 200 and HTB bus 230. AHB-to-HTB bus bridge 215 also allows for efficient communication between the two high performance busses. In this respect, MTAHB provides three main features:

1. a write buffer to reduce the number of stalls to the CPU 210 while writing to HTB bus 230;
2. a time-out counter allowing CPU 201 to change tasks if a read of HTB bus 230 takes too long; and
3. a set of control registers and control logic as required in bus-master devices.

The AHB bus 200 should contain as slaves only the blocks closely related to memory, such as external memory interface (EMI) 202, random access memory (RAM) 207 and read-only memory (ROM) 208, as well as AHB-to-APB bus bridge 209 to APB bus 220 and AHB-to-HTB bus bridge 215 to HTB bus 230. Central processing unit (CPU) 201 connects to AHB bus 200 via CPU advanced high performance memory bus interface 206. Note that APB bus 220 connects to moderate performance peripherals 221 to 222 in the same manner as illustrated in FIG. 1. HTB bus 230 contains bus slave peripherals 231 and 232, bus master peripheral 233 and random access memory (RAM) 235. HTB bus 230 supports only two bus masters, high priority data transfer bus master peripheral 233 and AHB-to-HTB bus bridge 215. If more bus masters are required, another HTB bus can be added to the system through the use of another AHB-to-HTB bus bridge, connected as a slave on AHB bus 200.

Note that AHB-to-HTB bus bridge 215 cannot automatically read the data from the requested device for an AHB bus device. This is so because bits may change in HTB bus device after AHB-to-HTB bus bridge 215 performed the read. This can result in AHB-to-HTB bus bridge 215 holding obsolete data. As a result, the AHB bus device must read the HTB bus device directly.

The requirement for HTB bus arbiter/decoder 216 differs significantly from that of the AHB bus arbiter/decoder 214. In a real-time application, where the events that trigger a HTB bus peripheral occur externally to CPU 201, a priority scheme must be created that will insure the speedy transfer of data from the peripheral to its destination, which may be another peripheral or RAM.

Due to the non-deterministic behavior inherent to arbitration on AHB bus 200, the HTB bus arbiter/decoder 216 will always grant use of HTB bus 230 to the peripheral on the highest priority channel. Even if AHB-to-HTB bus bridge 215 has control of HTB bus 230, if the other bus master requests control, HTB bus arbiter/decoder 216 will suspend the current AHB-to-HTB data transfer operation and grant control to the HTB bus master 233.

AHB-to-HTB bus bridge 215 will handle the stall operations during a write in a write buffer or from a read by initiating a time-out counter. There are normally only two possible masters on HTB bus 230: HTB bus master peripheral 233; and AHB-to-HTB bus bridge 215. The peripheral will occupy the higher priority, while AHB-to-HTB bus bridge 215 is on the lower priority.

Although preventing stalls on AHB bus 200 due to a memory bus device writing to a device on HTB bus 230 can be reduced through a write buffer as described above, reads are more difficult to handle. This is because in order to get the data requested, arbitration on HTB bus 230 must be won first.

Figure 3:
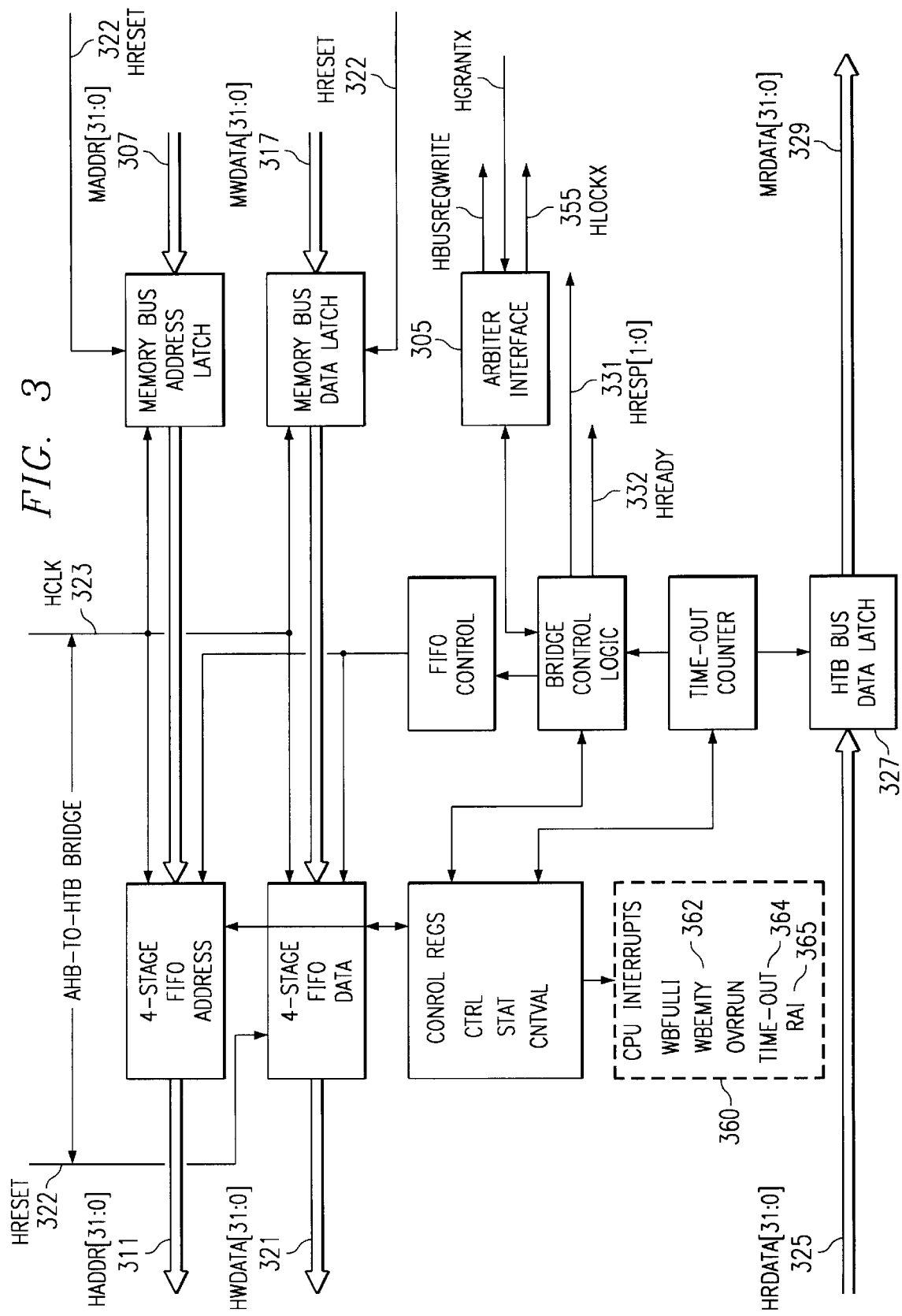
FIG. 3 illustrates the detailed block diagram of the advanced high performance bus bridge interface system (AHBIS)

FIG. 3 illustrates the internal construction of AHB-to-HTB bus bridge 215. AHB-to-HTB bus bridge 215 includes FIFO control 301, bridge control logic 303 and AHB-HTB time-out counter 302 as shown. The full codings of control registers 340 (including CTRL register 341, STAT register 342 and CNTVAL register 343) are described below. Each of the control registers of control registers 340 are accessible by CPU 201. The write buffer is essentially a pair of FIFOs 310 and 320 with respective input register stages 309 and 319. Address FIFO 310 and data FIFO 320 have the same number of stages. FIG. 3 illustrates an example of 4 stages. Memory bus address latch 309 latches the full address MADDR [31:0] 307 from AHB bus 200. Memory bus data latch 319 latches the data MWDATA [31:0] 317 from AHB bus 200. This differs from a traditional write buffer used in a cache scheme, where either the address or data is usually latched and then written back to the memory. The write buffer of this invention allows an AHB bus device to write data to the HTB bus device without having to wait for arbitration. So long as the write buffer is not full, AHB bus 200 will not stall due to waiting for arbitration on HTB bus 230. FIFOs 310 and 320 are reset by HRESET signal 322. Memory bus address latch 309, address FIFO 310, memory bus data latch 319 and data FIFO 320 are clocked via HCLK 323.

CPU interrupts 360 includes WBFULLI 361, WBEMPTY 32, OVRRUN 363, TIME-OUT 364 and RAI 365. If write buffer FIFOs 310 and 320 becomes full, bridge control logic 303 sets a WBFULL status bit within STAT register 342. If interrupt is enabled via a WBFULLE bit of CTRL register 341, then bridge control logic 303 generates an interrupt WBFULLI 361. If AHB bus 200 writes another word when the write buffer FIFOs 310 and 320 are full, the previous word will be overwritten and lost. Under these conditions bridge control logic 303 generates OVRRUN interrupt 363 if overrun interrupts are enabled via a WBOI bit of STAT register 342. To prevent the loss of data, software of each writing device must make sure an overrun condition is not created. When a full buffer becomes empty, bridge control logic 303 generates another interrupt WBEMTY 362 if a WBEMTYE bit of STAT register 342 enables such an interrupt.

In order to write to a HTB bus peripheral, CPU 201 or DMA 203 must first be granted control of AHB bus 200 by AHB bus arbiter 214. Then AHB-to-HTB bus bridge 215 must be granted control of HTB bus 230 by HTB bus arbiter 216. When the AHB-to-HTB bus bridge 215 is granted control of HTB bus 230, AHB-to-HTB bus bridge 215 will supply the address latched in address FIFO 310 to HTB bus arbiter/decoder 216. HTB bus arbiter/decoder 216 will decode this address to supply the necessary chip select signals analogous to select signal 112 illustrated in FIG. 1. Since the entire system contains only one memory map, this will not cause any conflicts to other devices on other busses. When generating the address, AHB-to-HTB bus bridge 215 will follow standard AHB bus timings, pipelining the address one cycle before outputting the data.

To prevent possible read-after-write (RAW) errors, if there is any data in write buffer FIFOs 310 and 320, AHB-to-HTB bus bridge 215 will not allow a read from HTB bus 230 until write buffer FIFOs 310 and 320 have cleared. If a read request is made, time-out counter 302 will start while write buffer FIFOs 310 and 320 are emptying data.

Referring again to FIG. 3, when the first word is written to AHB-to-HTB bus bridge 215 from AHB bus 200, the full address will be latched into memory bus address latch 309 and data will be latched in memory bus data latch 319. When latched, the AHB-to-HTB bus bridge 215 will make a request HBusReqWrite 351 to the HTB Bus 230. A grant is acknowledged by grant signal HGrantx 353. If granted, the address in memory bus address latch 309 will be supplied to HAddr bus 311 and data in memory bus data latch 319 will be supplied to HData bus 321. This supply may be via write buffers FIFOs 310 and 320 if these FIFOs contain data. Arbiter interface 305 will also generate HLockx signal 355 to HTB arbiter 216. If not granted, the AHB-to-HTB bus bridge 215 can store more address and data in FIFOs 310 and 320 until these FIFOs are full. When the FIFOs 310 and 320 are full, AHB-to-HTB bus bridge 215 signals a not ready HREADY event 332 to the master on AHB bus 200.

Time-out counter 302 starts when AHB-to-HTB bus bridge 215 attempts to arbitrate to obtain control of HTB bus 230. The count of time-out counter 302 is initialized by the value stored in CNTVAL register 343. Time-out counter 302 is selectively enabled by the state of a TOE bit of CTRL register 341. Upon time-out, bridge control logic sets a TOI bit of STAT register 342. Control registers 340 also generates a time-out interrupt 364 if time-out interrupts are enabled by a TOIE bit of CTRL register 341. Following such a time-out, when AHB-to-HTB bus bridge 215 is granted control of HTB bus 230, bridge control logic 303 sets a RAI bit of status register 342. Additionally, AHB-to-HTB bus bridge 215 generates a read available interrupt (RAI) 365 if RAI interrupt is enabled by the RAIE bit of CTRL register 341.

The following is a summary of the content of the three control registers illustrated as block 340 of FIG. 3 which are a part of AHB-to-HTB bus bridge 215. The coding of control register CTRL 341 is listed in Table 1.

TABLE 1

| Bits | Mnemonic | Definition |
|------|----------|------------|
| 15:7 | Reserved | Reads undefined, writes no effect |
| 6 | WBFULLE | Write Buffer Full Interrupt Enable If Write Buffer Full 0 = no interrupt: 1 = will interrupt |
| 5 | WBEMTYE | Write Buffer Empty Interrupt Enable If Write Buffer Empty 0 = no interrupt: 1 = will interrupt |
| 4 | RAIE | Read Available Interrupt Enable If Read Available 0 = no interrupt: 1 = will interrupt |
| 3 | WBOIE | Write Buffer Over-run Interrupt Enable If Write Buffer Over-run 0 = no interrupt: 1 = will interrupt |
| 2 | WBE | Write Buffer Enable 0 = not enabled: 1 = enabled |
| 1 | TOIE | Time-Out Interrupt Enable If Time-Out Counter reaches hexadecimal 0000 0 = no interrupt: 1 = will interrupt |
| 0 | TOE | Time-Out Enable 0 = not enabled: 1 = enabled |

Regarding the Write Buffer Enable bit (WBE), the size of the white buffer is determined upon manufacture. Regarding the time-out interrupt enable bit (TOIE), when the time-out counter 302 reaches hexadecimal 0000, an interrupt is generated. If this bit is set, the interrupt will be sent to CPU 201. Regarding the time-out enable bit (TOE), this selectively enables the time-out count-down register. This can be used to free CPU 201 to perform another task if AHB-to-HTB bus bridge 215 cannot win arbitration on HTB 230 bus in the time period of time-out counter 302.

The coding of status register STATUS 342 is listed in Table 2.

TABLE 2

| Bits | Mnemonic | Definition |
|------|----------|------------|
| 15:6 | Reserved | Reads undefined, writes no effect |
| 5 | WBFULL | Write Buffer Full 0 = not full: 1 = full |
| 4 | WBEMTY | Write Buffer Empty 0 = not empty: 1 = empty |
| 3 | RAI | Read Available Interrupt After a time-out event, AHB-to-HTB bus bridge has finally won arbitration 0 = Data may not be read from HTB bus 1 = Data may be read from HTB, bus |
| 2 | WBOI | Write Buffer Overrun Interrupt 0 = Data not overwritten: 1 = Data overwritten |
| 1 | WBF | Write Buffer Full. 0 = not full: 1 = full |
| 0 | TOI | Time-Out Interrupt 0 = No Time-Out or not enabled 1 = Time-Out counter has reached 0 |

Regarding the write buffer full bit (WBF), it is generally used to detect when the entire write buffer has been filled by writes to AHB-to-HTB bus bridge 215 and write buffer FIFOs 310 and 320 have not had a chance to write the data to HTB bus 230. This bit will become inactive as soon as a single location within write buffer FIFOs 310 and 320 is free. If write buffer FIFOs 310 and 320 are full and another write occurs, the previous data in the write buffer will be lost. Regarding the write buffer empty bit (WBEMTY), this is active when the entire write buffer FIFOs 310 and 320 are empty. If write buffer FIFOs 310 and 320 had been full previously and then becomes empty, an interrupt is generated. Regarding the read available interrupt bit (RAI) 365, this indicates that, after a time-out has occurred, that AHB-to-HTB bus bridge 215 has finally won arbitration and that the AHB bus device may proceed with a read. Regarding the write buffer overrun interrupt bit (WBOI), this indicates that the buffer was full and another write occurred, overwriting some data. This should not happen in normal operation. When write buffer FIFOs 310 and 320 are full, an HReady signal 332 on AHB bus 200 will be pulled high by AHB-to-HTB bus bridge 215 indicating no more transfers should occur. Regarding the write buffer full bit (WBF), this is a read-only status signal which indicates that write buffer FIFOs 310 and 320 are full and cannot accept new data. When active the write buffer full bit (WBF) also indicates that HReady signal 332 is active for AHB-to-HTB bus bridge 215. Regarding the time-out interrupt bit (TOI), this is active when time-out counter 302 reaches 0. This timer is provided so that during a read to HTB 230, if an unacceptable amount of time is required to win arbitration by AHB-to-HTB bus bridge 215 on behalf of CPU 201, that CPU 201 may switch to another task and continue doing useful work.

The coding of counter value register CNTVAL 343 is listed in Table 3.

TABLE 3

| Bits | Mnemonic | Definition |
|---|---|---|
| 15:0 | CNTVAL | Start value for the Time-Out counter. The number of HCLK cycles to time-out |

The counter value register CNTVAL 343 stores the start value for time-out counter 302. Upon expiration of the count of time-out counter 302, bridge control logic generates time-out interrupt 364 if the TOIE bit of CTRL register 341 enables such interrupts. Note that the TOE bit of CTRL register 341 controls whether time-out counter 303 is enabled or disabled. This counter may be used during a read operation. If a peripheral already has won arbitration of HTB bus 230 and will not relinquish control due to a real-time constraint, the user may program a value here that will determine how many HCLK cycles to wait before causing a time-out interrupt. This time-out interrupt will permit CPU 201 on AHB bus 200 to stop waiting for a HTB bus grant and continue doing other operations such as running another task.

AHB-to-HTB bus bridge 215 further includes HTB bus data latch 327. HTB bus latch 327 latches data from read from HTB bus 230 via HRData bus 327 and supplies data to the AHB bus 200 via MRData bus 329. Note that AHB-to-HTB bus bridge 215 is a slave to AHB bus 200. Thus AHB-to-HTB bus bridge 215 cannot make a read or write request on AHB bus 200. Since AHB-to-HTB bus bridge 215 cannot make read or write requests, it cannot source an address to AHB bus 200. Accordingly, AHB-to-HTB bus bridge 215 does not need a HTB bus address latch.

Figure 4:
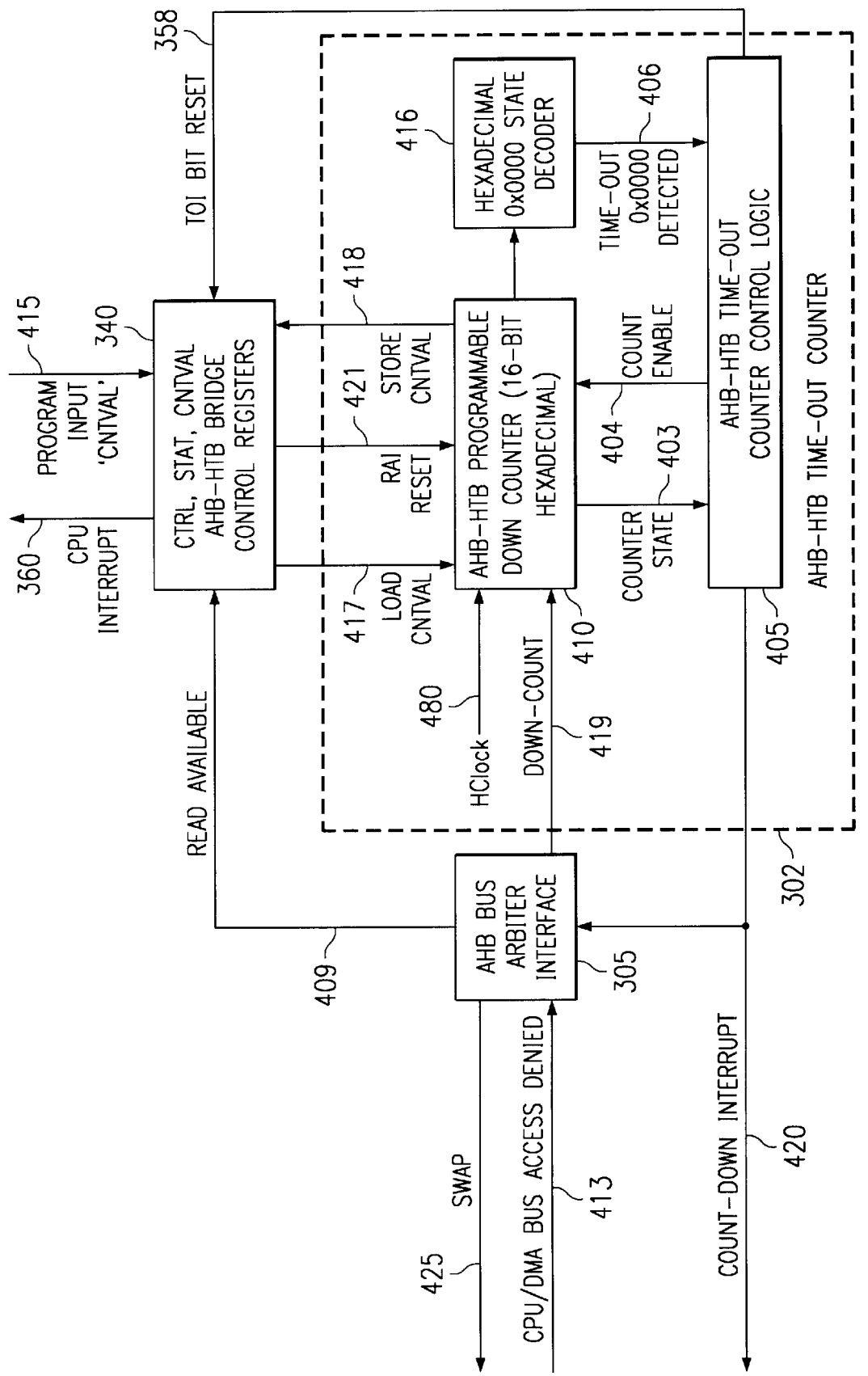
FIG. 4 illustrates the detailed block diagram of the AHB-HTB time-out counter of this invention.

FIG. 4 illustrates the detailed block diagram of AHB–HTB time-out counter 302 illustrated in FIG. 3 in relation to other parts of the system. Time-out counter 302 provides a capability for an AHB bus master to time-out if it is not given control of HTB bus 230 in a certain time period. This is an addition to the conventional AHB bus functionality and is useful if HTB arbitration would otherwise leave an HTB bus master in total control of HTB bus 230. This occasion arises in AHB-HTB bus bridge 215 when the AHB bus master requests a read of an HTB bus peripheral but the HTB peripheral is in the process of a long data transfer and cannot be interrupted.

When the AHB bus master, for example CPU 201, requests a read from an HTB module, AHB-HTB bus bridge 215 will make an HTB bus request. If this request is granted by HTB bus arbiter/decoder 216, then CPU 201 may read the data immediately. If the request is not granted immediately, then time-out counter 302 will start counting down. If time-out counter 302 reaches hexadecimal 0000, time-out counter 302 generates a time-out interrupt. Then CPU 210 handles the interrupt. This may involve can switching tasks or performing some other function.

The heart of AHB-HTB time-out counter 302 is programmable down counter 410. Programmable down counter 410 receives a programmed input value 415 from CNTVAL control register by Load CNTVAL signal 417. Programmable down counter 410 communicates the counter state back to CNTVAL control 341 register by store CNTVAL signal 418.

When a read request to a HTB bus device is made, if arbitration is not won immediately, the arbiter interface 305 will receive a signal 413 signifying that CPU/DMA access has been denied. Programmable down counter 410 in turn will receive a down-count signal 419 and will begin to count down by one on every HCLK signal 480. When down counter 410 reaches hexadecimal 0000, hexadecimal 0x000 state decoder 416 generates a time-out signal 406 which it supplies to AHB–HTB time-out counter control logic 405.

This time-out may be used directly as a countdown interrupt signal 420 or it can send a TOI bit reset signal 358 to STAT control register 342. Count-down interrupt signal 420 also may be sent to AHB bus arbiter/decoder 214 via the AHB bus arbiter interface 305. Swap signal 425 initiates a swap of bus masters in order to allow useful work to continue.

When arbitration is finally won again by the HTB bus master on the HTB bus, a separate read available signal 409 causes the read-available interrupt RAI bit in STAT control register 342 to go inactive causing RAI reset signal 421 to reset down counter 410 to its previous value. This allows the prior transfer activity on HTB bus 230 to resume.

What is claimed is:

1. A data transfer system comprising:

a plurality of first bus devices, at least one first bus device being a first bus data supplying device capable of supplying data, at least one first bus device being a first bus data receiving device capable of receiving data and at least one first bus device being a first bus master device capable of requesting and controlling data transfer;

a first data bus connected to each of said plurality of first bus devices and capable of transferring data from a first bus data supplying device to a first bus data receiving device under control of a first bus master device;

a plurality of second bus devices, at least one second bus device being a second bus data supplying device capable of supplying data, at least one second bus device being a second bus data receiving device capable of receiving data, at least one second bus device being a second bus master device capable of requesting and controlling data transfer, a predetermined one of said plurality of second bus devices being a dominant second bus master device;

a second data bus connected to each of said plurality of second bus devices and capable of transferring data from a second bus data supplying device to a second bus data receiving device under control of a second bus master device;

a bus bridge connected to said first data bus and said second data bus, said bus bridge capable of supplying data to said first bus, receiving data from said first bus, supplying data to said second bus, receiving data from said second bus, not capable of controlling data transfer on said first bus and capable of controlling data transfer on said second bus;

a second bus arbiter connected to each of said at least one second bus master device, said second bus and said bus bridge, said second bus arbiter granting control of data transfer on said second bus to one and only one of a set of devices including each second bus master and said bus bridge; and said bus bridge includes a time-out counter having a predetermined time started upon said bus bridge requesting control of said second bus from said second bus arbiter responsive to a first data receiving device requesting data transfer from a second bus data supplying device and not started upon said bus bridge requesting control of said second bus from said second bus arbiter responsive to a first data supplying device requesting data transfer to a second bus data receiving device.

2. The data transfer system of claim 1, wherein:
said at least one first bus master device consists of a central processing unit.

3. The data transfer system of claim 1, wherein:
said at least one first bus master device consists of a direct memory access unit.

4. The data transfer system of claim 1, wherein:
at least one first bus supplying/receiving device consists of a memory which is not capable of controlling data transfer.

5. The data transfer system of claim 1, wherein:
said at least one first bus master device consists of a central processing unit; and
said bus bridge is further connected to said central processing unit to supply an interrupt signal to said central processing unit upon expiration of said predetermined time of said time-out counter.

6. The data transfer system of claim 1, wherein:
said bus bridge further includes a control register having a predetermined time-out bit, said bus bridge setting said time-out bit to a predetermined digital state upon expiration of said predetermined time of said time-out counter.

7. The data transfer system of claim 1, wherein:
said bus bridge further includes a control register storing a time-out value, said bus bridge loading said time-out value into said time-out counter for control of said predetermined time upon requesting control of said second bus from said second bus arbiter.

8. The data transfer system of claim 7, wherein:
said at least one first bus master device consists of a central processing unit, said control register of said bus bridge loadable from said central processing unit.

9. The data transfer system of claim 1, wherein
said bus bridge resets said time-out counter upon grant of control of said second bus by said second bus arbiter.

10. The data transfer system of claim 1, wherein:
said bus bridge further includes
an address FIFO buffer receiving an address from a first bus data supplying device via said first bus and supplying said address to a second bus data receiving device via said second bus, and
a data FIFO buffer receiving data from a first bus data supplying device via said first bus and supplying said data to a second bus data receiving device via said second bus.

11. The data transfer system of claim 10, wherein:
said bus bridge generating a buffer full signal when said address FIFO buffer and said data FIFO buffer are full.

12. The data transfer system of claim 11, wherein:
said at least one first bus master device includes a central processing unit responsive to interrupt signals; and
said buffer full signal of said bus bridge consists of a buffer full interrupt signal supplied to said central processing unit.

13. The data transfer system of claim 11, wherein:
said at least one first bus master device includes a central processing unit responsive to interrupt signals;
said bus bridge further includes at least one control register having a buffer full interrupt control bit; and
said bus bridge generates a buffer full interrupt signal supplied to said central processing unit when said address FIFO buffer and said data FIFO buffer are full and said buffer full interrupt control bit has a first state and does not generate a buffer full interrupt signal supplied to said central processing unit when said buffer full interrupt control bit has a second state opposite to said first state.

14. The data transfer system of claim 10, wherein:
said bus bridge generates a buffer overrun signal when said address FIFO buffer and said data FIFO buffer are full and said bus bridge receives an addition address and additional data from said first bus data supplying device.

15. The data transfer system of claim 14, wherein:
said at least one first bus master device includes a central processing unit responsive to interrupt signals; and
said buffer overrun signal of said bus bridge consists of a buffer overrun signal supplied to said central processing unit.

16. The data transfer system of claim 14, wherein:
said at least one first bus master device includes a central processing unit responsive to interrupt signals;
said bus bridge further includes at least one control register having a buffer overrun interrupt control bit; and
said bus bridge generates a buffer overrun interrupt signal supplied to said central processing unit when said address FIFO buffer and said data FIFO buffer are full and said buffer overrun interrupt control bit has a first state and does not generate a buffer overrun interrupt signal supplied to said central processing unit when said buffer overrun interrupt control bit has a second state opposite to said first state.

17. The data transfer system of claim 10, wherein:
said bus bridge generates a buffer empty signal when said address FIFO buffer and said data FIFO buffer are empty.

18. The data transfer system of claim 17, wherein:
said at least one first bus master device includes a central processing unit responsive to interrupt signals; and
said buffer empty signal of said bus bridge consists of a buffer empty interrupt signal supplied to said central processing unit.

19. The data transfer system of claim 17, wherein:
said at least one first bus master device includes a central processing unit responsive to interrupt signals;
said bus bridge further includes at least one control register having a buffer empty interrupt control bit; and
said bus bridge generates a buffer empty interrupt signal supplied to said central processing unit when said address FIFO buffer and said data FIFO buffer are empty and said buffer empty interrupt control bit has a first state and does not generate a buffer empty interrupt signal supplied to said central processing unit when said buffer empty interrupt control bit has a second state opposite to said first state.

20. The data transfer system of claim 10, wherein:

said bus bridge responsive to a first data receiving device requesting data transfer from a second bus data supplying device not arbitrating for control of said second bus via said second bus arbiter while said address FIFO buffer and said data FIFO buffer are not empty.

21. The data transfer system of claim 10, wherein:

said bus bridge generates a read available signal when said predetermined time of said time-out counter has expired and said second bus arbiter grants control of said second bus to said bus bridge.

22. The data transfer system of claim 21, wherein:

said at least one first bus master device includes a central processing unit responsive to interrupt signals; and said read available signal of said bus bridge consists of a read available interrupt signal supplied to said central processing unit.

23. The data transfer system of claim 21, wherein:

said at least one first bus master device includes a central processing unit responsive to interrupt signals;

said bus bridge further includes at least one control register having a read available interrupt control bit; and said bus bridge generates a read available interrupt signal supplied to said central processing unit when said predetermined time of said time-out counter has expired and said second bus arbiter grants control of said second bus to said bus bridge and said read available interrupt control bit has a first state and does not generate a read available interrupt signal supplied to said central processing unit when said read available interrupt control bit has a second state opposite to said first state.

* * * * *